United States Patent [19]

Toivio et al.

[11] Patent Number: 4,675,503
[45] Date of Patent: Jun. 23, 1987

[54] ELECTRIC RESISTOR ELEMENT

[76] Inventors: Ilkka Toivio; Terttu Toivio, both of Likolammenkatu 15, 15850 Lahti, Finland

[21] Appl. No.: 763,347

[22] Filed: Aug. 7, 1985

[30] Foreign Application Priority Data

Oct. 22, 1984 [FI] Finland ............................ 844154
Feb. 15, 1985 [FI] Finland ............................. 85130

[51] Int. Cl.⁴ .................................... H05B 3/58
[52] U.S. Cl. ............................ 219/205; 219/202; 219/536; 219/542
[58] Field of Search ........... 219/205, 536, 542, 544, 219/438, 439, 200, 201, 202

[56] References Cited

U.S. PATENT DOCUMENTS

| | | | |
|---|---|---|---|
| 1,781,412 | 11/1930 | Slichter | 219/205 |
| 3,564,199 | 2/1971 | Blaha | 219/205 |
| 3,657,517 | 4/1972 | Hoyt | 219/439 |
| 3,842,241 | 10/1974 | Isaacson | 219/438 |
| 3,940,591 | 2/1976 | Ting | 219/205 |

FOREIGN PATENT DOCUMENTS

| | | | |
|---|---|---|---|
| 3230421 | 2/1984 | Fed. Rep. of Germany | 219/205 |
| 2501790 | 9/1982 | France | 219/205 |
| 2072469 | 9/1981 | United Kingdom | 219/205 |

Primary Examiner—E. A. Goldberg
Assistant Examiner—Teresa J. Walberg
Attorney, Agent, or Firm—McGlew and Tuttle

[57] ABSTRACT

An electric resistor element which can be installed on the outer surface of a filter such as the oil or fuel filter of a combustion engine. The electric resistor element is designed especially for improving the cold starting of a combustion engine. It is suited to be employed particularly during the cold seasons, and apart from improving the cold starting, it is also designed for heating the fuel - such as diesel oil before feeding it into the engine. In connection to the oil filter, onto its outer surface there is arranged the electric resistor element in such a fashion that the caloric capacity produced therein is conducted as as effectively possible into the oil filter proper and therealong further into the oil contained in the filter. The electric resistor element is formed as a wide and thin tape and attached around the oil filter, preferably in the vicinity of the filter ring between the oil filter and the engine or the like. The electric resistor element has the form of one annular layer and its thickness is profitably not over 3 mm. The resistor element can also be attached around the filter by means of the pressure hoop. The electric resistor can also be placed completely within the metal shell.

8 Claims, 7 Drawing Figures

FIG. 4A
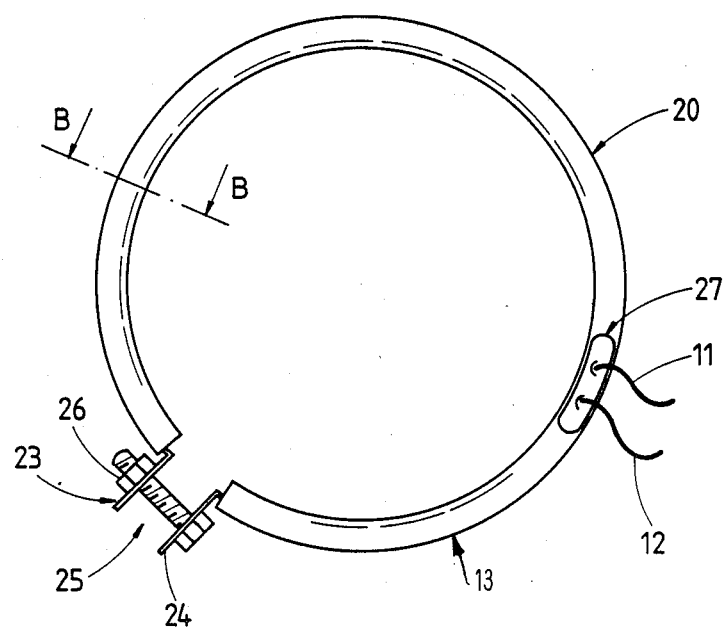
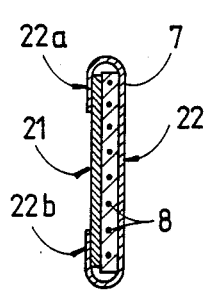
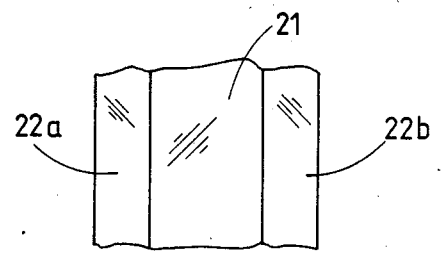
FIG. 4B
FIG. 4C

ELECTRIC RESISTOR ELEMENT

The present invention relates to an electric resistor element which can be installed on the outer surface of a filter such as the oil or fuel filter of a combustion engine. The electric resistor element is designed especially for improving the cold starting of a combustion engine. It is suited to be employed particularly during the cold seasons, and apart from improving the cold starting, it is also designed for heating the fuel—for instance diesel oil—before feeding it into the engine.

During the cold seasons, the successful starting of an automobile or other such vehicle is uncertain after several hours of parking. Especially the starting of an automobile which has been parked outside overnight in low-zero temperatures is often not carried out successfully because the resistance to revolution in the engine is great due to the solid state of the lubricating oil, and because the battery charge is reduced owing to the cold, wherefore the current available for the starting motor is lowered. Thus the chances for a successful starting of a diesel engine, a petrol engine or other corresponding engine are reduced. In addition to this, cold starting wears the engine and shortens its working age.

In the prior art there is known an apparatus for improving the cold starting of an engine, introduced in the Finnish Pat. No. 66059, wherein an ordinary oil filter is constructed as a thermal battery by coating it with a heat insulator and by providing it with one or more electric resistors in order to heat the oil contained in the filter or to maintain the heat therein. The electric resistors are profitably located on the outer surface of the oil filter. The electric resistor can be connected to the battery either directly or via a timer. A thermostat has also been employed in this function.

The major drawback in the aforementioned apparatus is the fact that the oil filter is provided with heat insulation. The heat insulator must be made to match the measures of the oil filter, and even in ideal conditions the thickness of the heat insulator walls is about 10 mm. Consequently the installation of the apparatus becomes cumbersome because the engine space tends to be cramped and there is not enough space left around the oil filter. Another solution is to place the resistor inside the oil filter, but this arrangement requires changes in the structure of the filter.

An object of the invention is to eliminate the above mentioned disadvantages and to provide a reliable but simple apparatus which considerably improves the starting of a combustion engine in cold, even in arctic circumstances. This is achieved by the characteristic novel features of the invention which are presented in the appended patent claims.

About the advantages of the present invention, as compared to the above described prior art apparatuses, the following is pointed out. The structure of the apparatus of the invention is simple; at simplest the resistor element is a wide and thin tape which is easily attached to its place. Especially remarkable is the fact that a particular heat insulator is not needed anymore. The reason for this is that the wide resistor surface is pressed against the metal shell of the oil filter, onto which shell the major part of the thermal energy produced by the electric resistor is conducted. It is well known that air is a poor conductor of heat. The apparatus is particularly effective in operation if the resistor is placed in the vicinity of the juncture between the oil filter and the engine. In that case heat is conducted into the oil contained in the filter both directly through the metal filter shell and along the metal parts of the filter's base or of its fastening members into the inner parts of the filter and into the filter insert proper, and thus into the oil contained in the middle of the filter.

The tape-like resistor is profitably arranged as one thin layer on the surface of the oil filter. In a preferred embodiment of the invention, the thickness of the layer is about two millimeters so that it can be conveniently attached to all types of oil filters. The tape-like resistor can be fixed to place by means of a thin plastic tape or the like, in which case the layer surrounding the oil filter is not remarkably increased as a whole. The advantages of a resistor element provided with a metal shell are described further below.

In the following the invention is explained in detail with reference to the appended drawing, where FIG. 1 is a schematical illustration of the pressurized circulation lubrication of a combustion engine, FIG. 2 is an illustration of the oil filter of the pressurized circulation lubrication arrangement, on the outer surface of which oil filter there is installed the electric resistor element according to the invention;

FIG. 4A is an illustration of an electric resistor element provided with a metal shell;

FIG. 4B shows the electric resistor element provided with a metal shell in cross-section, and FIG. 4C shows the outer surface to the same electric resistor element seen from the side.

Figure 1:
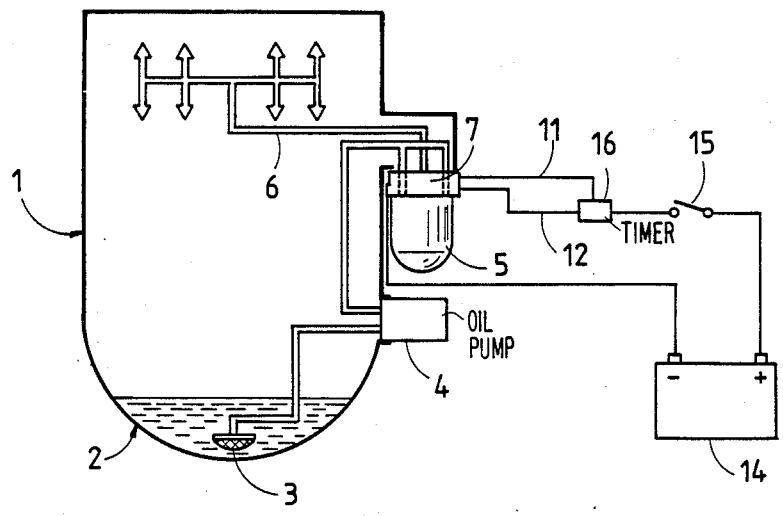

As is well known, pressurized circulation lubrication is nowadays commonly used in four-stroke engines. This is usually arranged so that the bottom of the oil crank 1, i.e. the so-called oil sump 2, functions as an oil tank wherefrom the oil is sucked through the strainer 3 into the oil pump 4. Thereafter the oil is forced through the oil filter 5 into the main oil duct 6, wherefrom it passes along the various oil ducts to lubricate the moving parts of the engine, such as the crank shaft, the camshaft and the valve gear. In principle the lubrication system of a diesel engine is alike the one described above.

Figure 2:
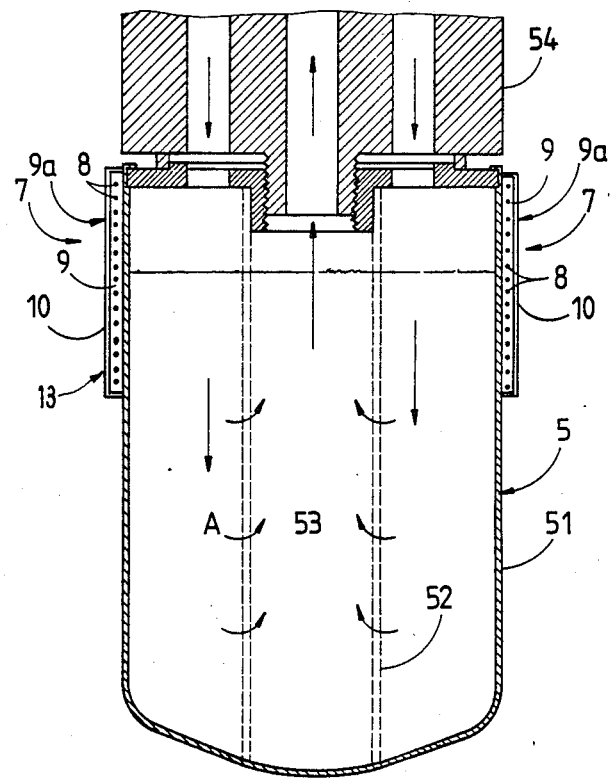

According to FIG. 2, in connection to the oil filter 5, onto its outer surface there is arranged the electric resistor element 7 in such a fashion that the caloric capacity produced therein is conducted as effectively as possible into the oil filter 5 proper and therealong further into the oil contained in the filter. The electric resistor element 7 is formed as a wide and thin tape and attached around the oil filter 5, preferably in the vicinity of the filter ring 54 between the oil filter 5 and the engine or the like. The electric resistor element 7 has the form of one annular layer and its thickness is profitably between 1...3 mm.

The electric resistor element 7 comprises either a plurality of resistor wires placed at certain intervals from each other, or a uniform resistor net 8 formed by the resistor wires. It can also be formed of several resistors connected either in parallel or in series. Surrounding the resistor net 8 there is arranged the electric insulation layer 9 which is made of a flexible heat-proof material such as silicone.

The band-like electric resistor element 7 cited above can be made to form a thin film or the like, the thickness whereof is for instance between 1 ... 1.5 mm. As for the width, there are no limitations. If desired, the resistor can be made to form a uniform annular member which can be drawn as a jacket on the oil filter 5. The only members protruding from the jacket are the resistor coupling wires 11, 12, whereby the jacket is connected to a power source such as a battery 14.

The electric resistor element 7 can be provided with an adhesive surface and thereby attached to the shell 51 of the oil filter 5. The resistor can also be attached by means of a plastic tape, plastic film or the like. It is profitable to employ a coating which covers the whole outer surface of the resistor element 7. Thus the coating simultaneously functions as a protective mechanical cover for the resistor.

The resistor element 7 can also be attached around the filter 5 by means of the pressure hoop 17. Advantageously this pressure hoop 17 encircles almost the whole filter 5. The length of the circle of the pressure hoop 17 is at least two thirds of the perimeter of the filter 5. The pressure hoop 17 is made of a stiff and flexible material, for instance plastic or other, preferably heat-insulating, material. IT can be bent open and slid around the filter 5 and the resistor element 7, whereafter it presses the resistor element tightly against the filter.

Figure 3A:
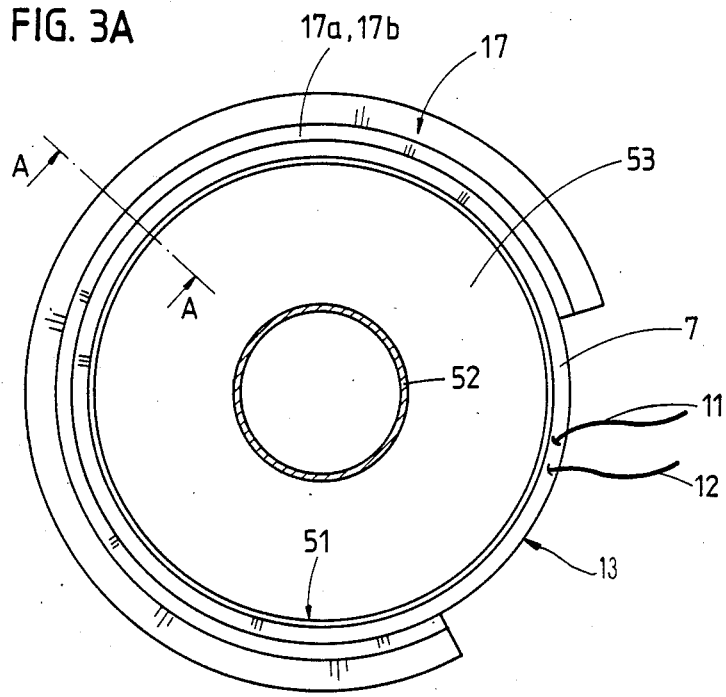
FIG. 3A is an illustration of an oil filter around which the electric resistor element is attached by means of a pressure hoop.
Figure 3B:
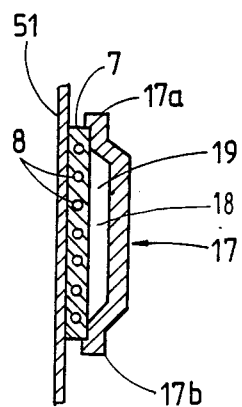
FIG. 3B shows the electric resistor element and the pressure hoop in cross-section.

In an advantageous application, in the middle part of the pressure hoop 17 there is arranged a cavity 18 in the lengthwise direction of the hoop, as can be seen in the cross-sectional illustration of FIG. 3B. Both edges 17a, 17b of the pressure hoop 17 press the resistor element 7 against the filter 5. The cavity 18 forms an air recess 19 in between the resistor element 7 and the pressure hoop 17, and this air recess thus functions as the heat-insulating member between the resistor element 7 and the pressure hoop 17. Consequently, heat losses can be decreased at least 10% compared to the case where a pressure hoop provided with a cavity, according to the above description, is not employed.

The top surface, i.e. the outer surface 9a of the electric resistor element 7 can be provided with a film which reflects thermal radiation back towards the resistor element 7. This film can be made of aluminium or other such metal. This kind of heat-reflecting film can also be used for fixing the resistor element 7 onto the surface of the oil filter 5. The ends of the film can be bent outwards with respect to the film circle and the filter. The ends can be interconnected by means of a suitable fastener, as is illustrated for instance FIG. 4A.

The electric resistor 7a can also be placed completely within the metal shell, as is apparent from FIGS. 4A, 4B and 4C. It is profitable that the shell ends in this type of resistor element 13 are left clear of the resistor wires or net proper. Thus the shell ends can be bent about 90° outwards with respect to the oil filter, and between the ends there can be arranged a suitable rapid fastener or clamp such as screw fastening. This fastening arrangement helps to press the electric resistor element tightly around the oil filter.

The metal shell 20 of the electric resistor 7a is advantageously formed of two parts, as is seen in FIG. 4B. The outer surface, i.e. the outer shell 21, advantageously comprises an elongate, flap-like member, the width whereof roughly corresponds to that of the resistor 7a. The inner surface, i.e. the inner shell 22 respectively also comprises an elongate, flap-like member, but it is wider than the resistor 7a and the outer shell 21. Now the edges 22a, 22b of the inner shell can be bent around the resistor 7a as well as on the edges of the outer shell 21 and pressed tightly against the outer shell as is seen in FIG. 4C. The created pressure joint holds the metal shell 20 well together. Both the inner and the outer shell are advantageously longer than the resistor 7a, so that the resistor is placed and locked within the metal shell 20 also at this end simply be pressing the shells 21, 22 together.

The outer shell 21 is preferably longer than the inner shell 22, in which case the ends 23, 24 of the outer shell can be bent outwards with respect to the resistor element 13 and the filter 5, and by means of these ends 23, 24 and the screw fastener 25, 26 the outer shell can be pressed around the filter as in the above description. The ends 23, 24 of the outer shell are provided with holes through which the screw 25, is fixed. By fastening the nut 26 which is fitted at the other end of the screw 25, the opening left between the ends of the resistor element 13 is narrowed and the element is pressed around the filter.

At a suitable place on the side of the inner shell 22 there is arranged an opening 27 through which the coupling wires 11, 12 are lead out of the resistor element 13.

The parts 21, 22 of the metal shell are made for instance of zinc-coated (galvanized) steel plate or rustproof steel plate.

It is profitable that the outer part 21 of the metal shell is thicker than the inner part 22. The thickness of the outer shell can be for instance 1 mm, whereas the thickness of the inner shell is only 0.5 mm. Thus the outer shell is capable of absorbing more of the heat energy radiated from the resistor and the filter than in the case where the outer shell is as thin as the inner shell. Apart from radiating out of the metal shell, the heat energy is also conducted along the bent edges 22a, 22b of the inner shell to the inner shell proper and further to the metal shell of the filter 5. By aid of the thick outer shell 21, it is possible to slow down the rising of the temperature in the resistor element and thus to even up any possible peaks in the temperature, as well as to prevent the resistor 7a from being destroyed due to too high a temperature. This is particularly important if the resistor element 13 is not provided with a heat-sensitive member such as a thermostat and an electric switch controlled by the sensitive member.

It is also pointed out that the thick outer surface 21 serves as a solid collar, by aid of which the resistor element 13 can be fixed around the filter 5. The thin inner shell 22 in turn is easily bent at the edges 22a, 22b around the resistor 7a and the outer shell 21 without cutting or denting the edges in any way (cf. FIG. 4C). This solution greatly simplifies the production process of the resistor element 13 provided with a metal shell, because all welding operations and extra cutting operations become unnecessary.

The magnitude of the resistor 7, 7a is defined so that the caloric capacity produced therein suffices to increase the temperature of the few desiliters of oil contained in the oil filter 5 at least 30 ° ... 50° higher than the surroundings within 5 ... 15 minutes. In ordinary passenger cars, the caloric capacity of the heat resistor is roughly between 50 ... 200 W.

The electric resistor element 7, 13 is connected to the power source 14 such as a battery, either directly via the switch 15 or via a thermostat. The sensitive member of the thermostat is placed either within the oil filter 5 or on the surface thereof. The desired maximum temperature can be adjusted and the thermostate controls that it is not surpassed. In addition to this, it is possible to employ a timer 16 in which case for example the heating of the engine can be started at a desired moment before the actual starting.

The apparatus of the invention functions as follows. The heating resistor 7, 7a of the apparatus is connected to the power source 14 for instance manually be means of the switch 15. In the space 53 of the oil filter 5 inside and outside the filter ring 52 (FIG. 2) there is always contained a small amount of oil, for example 2 dl, which starts warming up as the electric current passes through the resistor 7, 7a. After a suitable time, for instance 5 . . . 15 minutes, the temperature of the lubricating oil has sufficiently increased, for instance up to 40° . . . 50°, and the engine can be started. The thermostat controls that the oil temperature does not rise higher than to a desired degree, for example 90° C., or that the resistor temperature does not surpass the temperature where the resistor 7, 7a is destructed (for instace about 230° C. with a silicone resistor), although the waiting time should be longer than expected. This is particularly important when, after the desired time and by aid of the timer 16, the resistor 7 is connected to the power source 14. On the other hand, it is possible to arrange a light signal in the car dashboard in order to inform when the desired temperature is achieved and the starting can be carried out.

The warm oil contained by the apparatus rushed, immediately after starting, into the main oil duct 6 of the engine, or to another corresponding duct. Thus the cold engine receives a warm oil bath already during the first revolutions; the resistance to revolution in the engine is essentially decreased and a successful starting is secured.

The apparatus of the above description can also be employed in connection with the fuel filter of the engine. The resistor element 7, 13 is attached around the fuel filter such as diesel oil filter in the same fashion as around the oil filter. By means of this arrangement the diesel oil flowing through the filter can be kept warm in cold days or generally in winter time and so prevent solidification of paraffin wax in the diesel oil. It it is clear that during starting and thereafter, the heating of the diesel oil filter and the diesel oil by means of the resistor element of the invention remarkably improves flowing of the diesel oil and partly also contributes to a successful starting. Moreover, it prevents the engine from wearing, in a similar fashion as for instance the heating of the lubricating oil by a corresponding apparatus before starting.

We claim:

1. Electric resistor elements for installing on an outer surface of a filter, such as an oil or fuel filter of a combustion engine, which comprises an electric resistor formed as a wide and thin tape embedded within composite metal shell composed of two elongate and flap-like shell members including an inner shell member of selective reduced thickness for enhancing heat transfer therethrough and an outer shell member of increased thickness which is thicker than the inner shell member for inhibiting heat transfer therethrough, such that the electric resistor is disposed between the two shell members, with the edges of the inner shell member being folded outwardly over the adjacent edges of the electric resistor and the adjacent edges of the outer shell member and pressed tightly against the outer shell member, the two shell members being longer than the electric resistor such that the electric resistor is provided with a split collar-like structure, and the outer shell member being longer than the inner shell member, with the end of the outer shell member being bent outwardly relative to the electric resistor and provided with a fastening arrangement for drawing the ends of the outer shell member toward each other for tightening the collar-like structure upon mounting the structure on the outer surface of such a filter, whereby when the collar-like structure is so mounted and tightened the increased thickness outer shell member facilitates tensioning of the electric resistor and reduced thickness inner shell member against such filter outer surface while the bent ends of the outer shell member resist deformation under such tensioning in dependence upon such increased thickness of the outer shell member.

2. Element of claim 1 wherein the thickness of the electric resistor is at most about 3 mm.

3. Element of claim 1 wherein an opening is arranged at the side of the inner shell member through which electric coupling wires extend for connecting the electric resistor to an external power source.

4. Element of claim 1 wherein composite metal shell is made of galvanized steel plate.

5. Element of claim 1 wherein the composite metal shell is made of rust-proof steel plate.

6. Element of claim 1 wherein the fastening arrangement includes a screw and nut system for interconnecting the bent ends of the outer shell members.

7. Element of claim 1 wherein the thickness of the inner shell member is about 0.5 mm and the thickness of the outer shell member is about 1 mm.

8. Element of claim 1 wherein the thickness of the electric resistor is at most about 3 mm, the thickness of the inner shell member is about 0.5 mm and the thickness of the outer shell member is about 1 mm.

* * * * *